(12) United States Patent
Dew et al.

(10) Patent No.: US 8,268,038 B2
(45) Date of Patent: Sep. 18, 2012

(54) HIGH TEMPERATURE LEACHING PROCESS

(75) Inventors: David Dew, Johannesburg (ZA); Jaco Willem Steyn, Johannesburg (ZA); Susanna Helena Minnaar, Johannesburg (ZA)

(73) Assignee: BHP Billiton SA Limited, Johannesburg (ZA)

(*) Notice: Subject to any disclaimer, the term of this patent is extended or adjusted under 35 U.S.C. 154(b) by 106 days.

(21) Appl. No.: 12/740,822

(22) PCT Filed: Oct. 22, 2008

(86) PCT No.: PCT/ZA2008/000097
§ 371 (c)(1),
(2), (4) Date: Oct. 20, 2010

(87) PCT Pub. No.: WO2009/059336
PCT Pub. Date: May 7, 2009

(65) Prior Publication Data
US 2011/0023662 A1    Feb. 3, 2011

(30) Foreign Application Priority Data
Oct. 31, 2007 (ZA) .................. 2007/09458

(51) Int. Cl.
C22B 3/18 (2006.01)

(52) U.S. Cl. .............................. 75/722; 75/743; 423/27

(58) Field of Classification Search .................... 75/743, 75/722; 423/27
See application file for complete search history.

(56) References Cited

U.S. PATENT DOCUMENTS
2009/0320648 A1* 12/2009 Kummer et al. ................ 75/712

FOREIGN PATENT DOCUMENTS
| WO | WO 00/36168 | 6/2000 |
| WO | WO 02/070757 | 9/2002 |
| WO | WO 2004/081241 | 9/2004 |
| WO | WO 2006/099659 | 9/2006 |

OTHER PUBLICATIONS

Petersen J. et al., Thermophilic Heap Leaching of a Chalcopyrite Concentrate, Minerals Engineering, Pergamon Press, Oxford, GB, vol. 15, No. 11, Nov. 1, 2002; pp. 777-785; XP002464512 ISSN: 0892-6875.

* cited by examiner

*Primary Examiner* — George Wyszomierski
*Assistant Examiner* — Tima M McGuthry Banks
(74) *Attorney, Agent, or Firm* — Brinks Hofer Gilson & Lione; G. Peter Nichols (57) ABSTRACT

A method of conducting a bioleaching process including the steps of forming a main heap, culturing at least one microorganism which exhibits bioleaching activity in a predetermined temperature range, monitoring the temperature in the main heap, which is a result, at least, of microbial leaching activity and inoculating the heap with the cultured microorganism at least before the temperature reaches the predetermined range.

6 Claims, 7 Drawing Sheets

HIGH TEMPERATURE LEACHING PROCESS

This application claims priority to PCT Application Serial No. PCT/ZA2008/000097 filed Oct. 22, 2008 published in English on May 7, 2009 as PCT WO 2009/059336; and to South African Application No. 2007/09458 filed Oct. 31, 2007, the entire contents of each are incorporated herein by reference.

BACKGROUND OF THE INVENTION

This invention relates to a heap bioleaching process which is operated at elevated temperatures to achieve a high rate of mineral oxidation.

The invention is described hereinafter with particular reference to the leaching of chalcopyrite ore for the recovery of copper. This is by way of example only and, where relevant, the principles of the invention can be used for the leaching of other ores for the recovery of metals.

A heap containing chalcopyrite ore can be leached effectively if the heap temperature is in the thermophilic region i.e. above 60° C. and preferably from 65° C. to 70° C.

When a biological leaching process is started on a heap the temperature of the heap is initially at ambient temperature. Energy which is generated by the activity of suitable microorganisms which are introduced into the heap or which occur naturally gradually increases the heap temperature. However, the leaching activity of the microorganisms tails off radically in the temperature range of 50° C. to 60° C. and the heap temperature cannot readily rise above 60° C., a temperature level at which thermophilic cultures are activated. This phenomenon severely reduces the effectiveness of a biological leaching process carried out on chalcopyrite.

Figure 1:
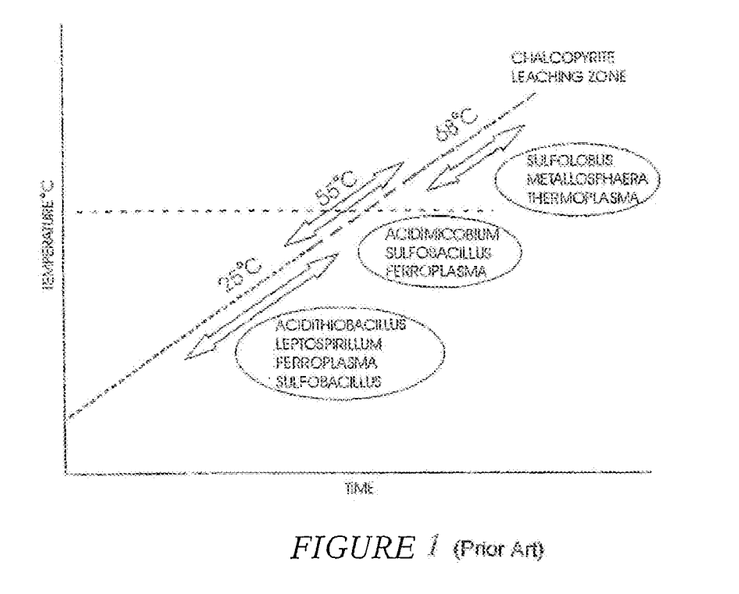

FIG. 1 of the accompanying drawings illustrates on a background of temperature versus time groups of microorganisms which are operative in different temperature regions. At normal mesophilic conditions the dissolution of chalcopyrite is very poor. Specific microorganisms grow in the higher temperature region and these microorganisms are critical to maintain a high Eh environment at elevated temperatures for chalcopyrite leaching.

FIG. 2 includes curves, marked AT, AC, AF and SM to designate *Acidithiobacillus thiooxidans, Acidithiobacillus caldus, Acidithiobacillus ferrooxidans* and *Sulfolobus metallicus*, respectively, which represent growth or activity rates for these microorganisms as a function of temperature. Microorganisms which are able to grow in the mesophilic region (up to 40° C.) die when the temperatures are increased to moderate thermophilic temperatures (50° C. to 60° C.). Similarly the moderate thermophilic microbes are not able to survive under thermophilic temperatures (in excess of 60° C.) and only the thermophilic microbes are able to grow in this temperature region. It is important therefore that a transition takes place from active mesophiles to active moderate thermophiles and then to active thermophiles in a heap leaching environment as the temperature rises inside the heap. If one of the microbial groups is absent microbial succession cannot take place successfully and thermophilic conditions cannot be reached.

Figure 3:
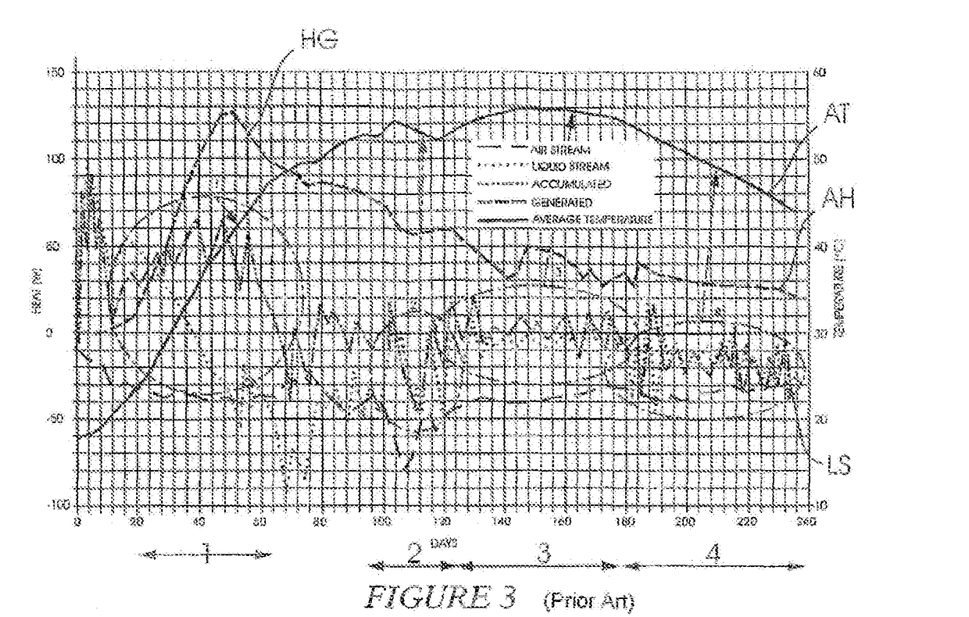

FIG. 3 illustrates a number of curves of heat or temperature variation, as a function of time, obtained in a simulated heap leaching environment. An air stream AS is directed into a heap to deliver oxygen and carbon dioxide to the microorganisms. Although the air stream is required it does exhibit a cooling effect on the heap and, in order to conserve heat, the air flow rate must be decreased.

A liquid stream LS of raffinate is drained from the heap. Heat extraction via the raffinate increases with the raffinate flow rate and, again, to conserve heat at a high reaction rate, the raffinate flow rate must be reduced.

The heat which is generated (HG) by the oxidising microorganisms increases as the reaction rate increases.

A curve AH reflects the accumulated heat in the heap, while the average temperature in the heap is reflected by a curve marked AT.

Four time zones 1 to 4 are marked in FIG. 3. In zone 2 the heap temperature has a significant dip. The temperature thereafter increases (zone 3) although, in zone 4, the temperature again decreases significantly. In zone 1, where the heat generation HG surpasses the heat losses AH, the heap temperature increases rapidly. This results in an increase in the heap temperature as pyrite oxidation increases.

It is evident from the aforegoing that a significant problem exists in bioleaching a heap of chalcopyrite ore in that the temperature gap of 50° C. to 60° C. in the heap must be carefully bridged to ensure that the heap temperature reaches the thermophilic zone at which chalcopyrite is amenable to effective bioleaching.

It is an object of the present invention to provide a method of operating a heap bioleaching process which addresses, at least partly, the aforementioned aspects.

SUMMARY OF INVENTION

The invention provides, in the first instance, a method of conducting a bioleaching process to recover metal content from an ore which contains the metal, the method including the steps of forming a main heap from the ore, culturing at least one microorganism which exhibits bioleaching activity in a predetermined temperature range, monitoring the temperature in the main heap which is a result, at least, of microbial leaching activity in the main heap and inoculating the main heap with the at least one cultured microorganism at least before the heap temperature reaches the predetermined temperature range.

The cultured microorganism may be a moderate thermophilic microorganism or a thermophilic microorganism and it may be added to the main heap at least when the heap temperature is in the mesophilic range or in the moderate thermophilic range.

The cultured microorganism may be added to the main heap in any appropriate way. In one preferred form of the invention the microorganism is added by means of irrigation.

At least one microorganism may be cultured in one or more build-up reactors. Preferably use is made of a plurality of reactors each of which is used for inoculum build-up of a respective microorganism which is active in a particular temperature range. In respect of the bioleaching of chalcopyrite the aforementioned temperature ranges are selected from temperatures which are centred on or which encompass the following temperature values 25° C., 35° C., 50° C., 55° C. and 65° C.

A single strain may be inoculated into the main heap or a mix of specific strains may be inoculated into the heap.

Inoculation may take place on a batch, i.e. a discontinuous, basis or on a continuous basis.

When inoculation takes place on a continuous basis the inoculant may be have a cell count of from $10^7$ cells/ml to $10^{10}$ cells/ml. Typically the cell concentration is of the order of $10^8$ cells/ml to $10^9$ cells/ml.

The build-up reactors may be operated at a site which is close to the heap. Air may be sparged into each reactor and the air may be supplemented with carbon dioxide. The carbon dioxide supplementation may be in the range of 0.1% to 5% v/v.

The inoculation may be carried out to maintain the cell count in the main heap at a value of from $10^6$ to $10^{12}$ cells/ton of ore.

In a variation of the invention, an inoculum from each reactor, instead of going directly from the reactor to the heap, is directed to a pond which is aerated and in which the inoculum is stored and maintained. Inoculum from the pond is then added to the main heap as necessary.

In a second variation of the invention the inoculum, for example, from one or more build-up reactors, is added to crushed ore, together with acid as required, and the inoculated ore is added to the main heap to introduce the inoculum to the main heap.

In another form of the invention an auxiliary heap which is relatively small compared to the main heap is operated in a closed circuit configuration. Inoculum from one or more of the build-up reactors or from the inoculum pond referred to, is used to irrigate the auxiliary heap. Leach solution draining from the auxiliary heap is recirculated to the auxiliary heap. The auxiliary heap thus acts as an inoculum generator and ore from this heap, onto which active microorganisms have attached themselves, is added to the main heap to introduce the active microorganisms to the main heap.

In a variation of the invention an intermediate leach solution, i.e. a solution which is extracted from the main heap and which is not subjected to a metal recovery process, and raffinate produced by passing a pregnant leach solution, draining from the main heap, through a metal recovery process, are recirculated to the main heap to increase the active cell count in the main heap. The intermediate leach solution may have a cell count of from $10^6$ cells/ml to $10^8$ cells/ml. The raffinate may have a similar cell count. Acid may be added to the raffinate as required.

The main heap may be sparged with air supplemented with carbon dioxide e.g. 0,1% $CO_2$ v/v.

According to a different aspect of the invention there is provided a heap bioleaching process which includes the step of adding iron and sulphur oxidising moderate thermophilic and thermophilic, cultures, to the heap at least when the temperature in the heap is at a mesophilic temperature, thereby to increase the rate of heat generation in the heap and so raise the temperature of the heap to the thermophilic region.

The invention also provides a heap bioleaching process for the recovery of copper from, at least, a chalcopyrite ore which includes the steps of forming a heap from the ore and thereafter adding at least iron and sulphur oxidising thermophilic cultures to the heap before the temperature of the heap reaches the thermophilic region.

BRIEF DESCRIPTION OF THE DRAWINGS

The invention is further described by way of example with reference to the accompanying drawings in which:

FIGS. 1, 2 and 3 have been referred to hereinbefore and therefore are not further described;

DESCRIPTION OF PREFERRED EMBODIMENTS

In a typical bioleaching process a heap is formed by agglomerating ore which is inoculated beforehand with suitable oxidising microorganisms. The invention is based on the discovery that thermophilic microorganisms do not survive the agglomeration process and the standing period which subsequently ensues, during the construction of a heap.

Figure 6:
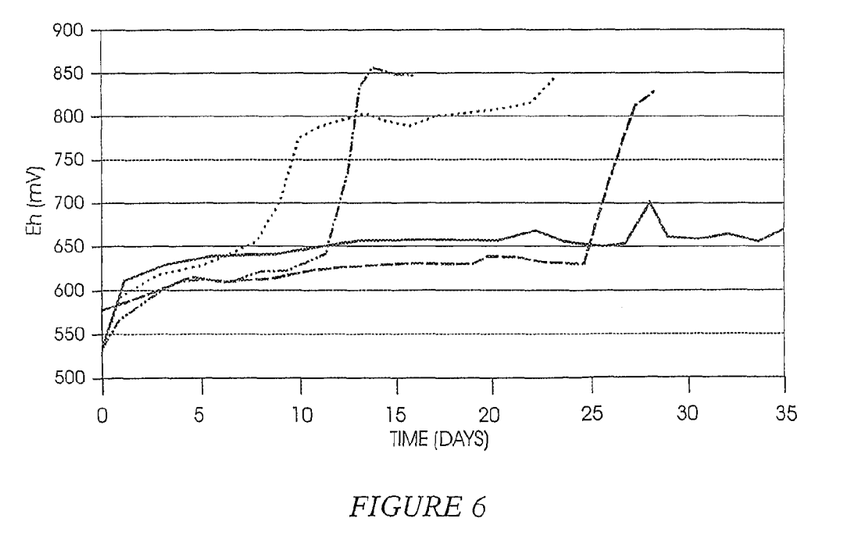
FIGS. 6 and 7 illustrate the results of shake flask microbial activity tests of microorganisms in freshly inoculated and agglomerated ore, and in ore which after inoculation, has been agglomerated and thereafter has been standing for about 90 days, respectively at 25° C., 35° C., 50° C., 55° C. and 65° C.
Figure 7:
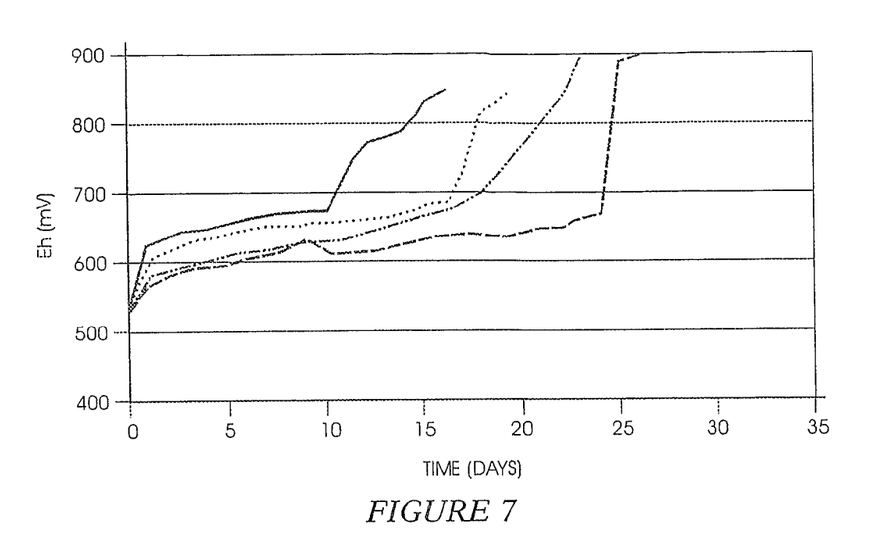

FIGS. 6 and 7 depict the results of shake flask microbial activity tests conducted on samples of freshly and agglomerated inoculated ore, and of inoculated and agglomerated ore which has been standing for 90 days, respectively, and incubated at 25° C., 35° C., 50° C., and 65° C.

FIG. 6 shows that microbial activity was observed at each of the aforementioned temperatures. However, with the 90 days standing material no microbial activity was observed at 65° C., although activity was exhibited at the lower temperatures 25° C., 35° C. and 50° C. (see FIG. 7).

Figure 8:
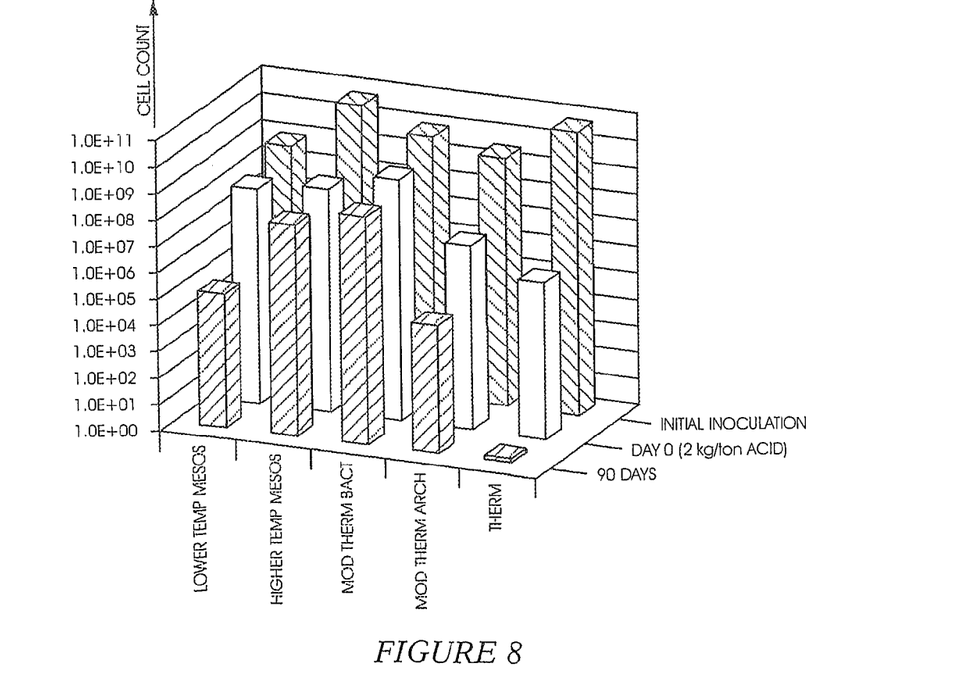
FIG. 8 is a bar chart of cell concentration levels in ore samples, as measured by RT PCR techniques, at an initial inoculation, on day 0 after the addition of 2 kg of acid per ton ore, and 90 days of the initial inoculation, for low temperature mesophiles, high temperature mesophiles, moderate thermophilic bacteria, moderate thermophilic archaea and thermophiles respectively.

The shake flask tests have been confirmed by RT PCR analyses which show that thermophiles do not survive the 90 days standing period—see FIG. 8. The microorganisms which are active at the lower temperatures do however survive the standing period even though the cell concentrations decrease with time.

Figure 9:
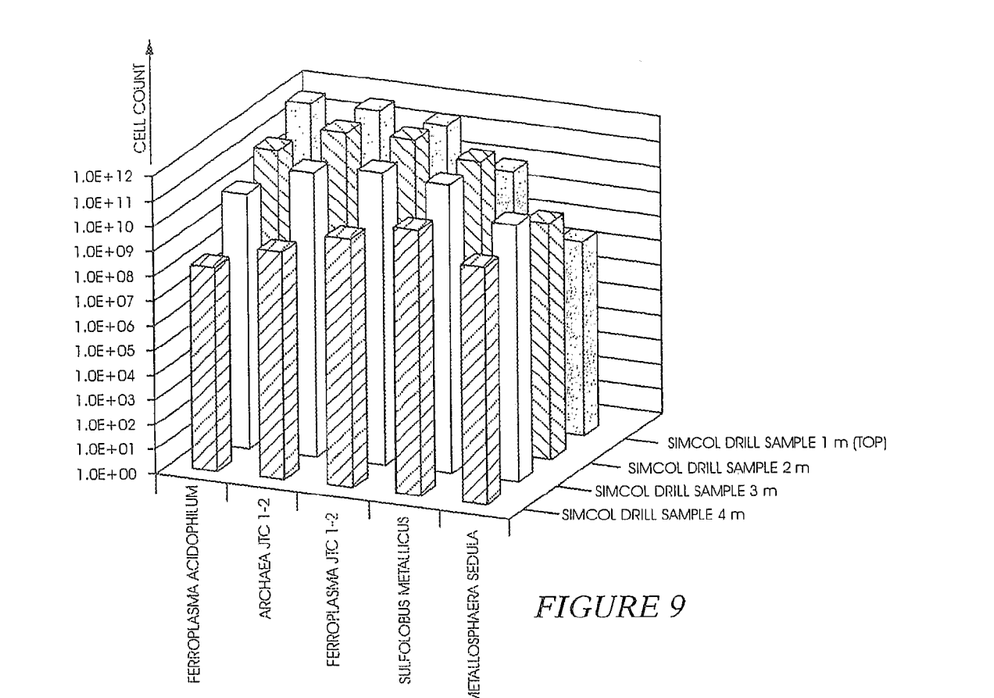
FIG. 9 shows comparative cell concentration levels or samples taken at different levels in a heap, of specimen microorganisms of the kind referred to in connection with FIG. 8, after re-inoculation of a heap.

FIG. 9 illustrates the effect of reinoculating a heap after a standing period of 90 days. The cell concentrations of all the microorganisms, for each of the samples which were taken at progressively increasing depths from the top of the heap, were thereby brought to a relatively high level. Significantly, the cell count for the thermophilic microorganisms was restored from the substantially zero value prevailing after the 90 days standing period shown in FIG. 8. Also, the thermophiles migrated down the heap and were present in the samples taken at different depths.

Figure 4:
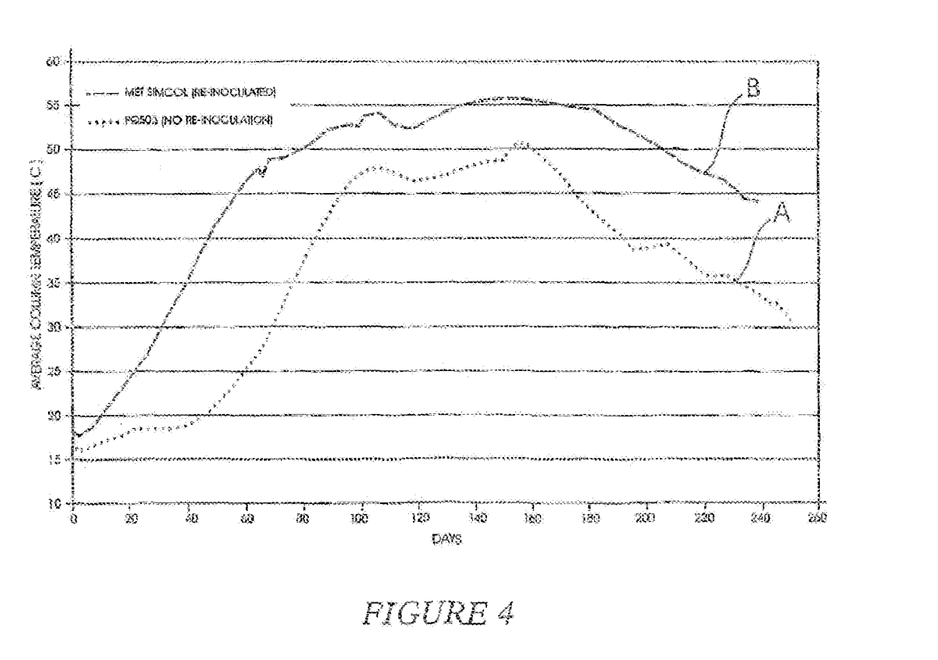
FIG. 4 shows temperature versus time curves, which illustrate the effect of re-inoculating a heap.

FIG. 4 has a first curve marked A of temperature in a heap versus time, where the heap is inoculated during agglomeration and not thereafter, and a second curve marked B of heap temperature versus time, where reinoculation of the heap takes place frequently or continuously.

The curve A confirms the results shown in FIGS. 7 and 9 in that the maximum heap temperature resulting from biological activity is only slightly above 50° C. due to the absence of thermophilic microorganisms. The curve B on the other hand shows the improvement which is obtained when inoculum was frequently added to the heap under test either in batch form or continuously. As a result of the inoculum addition the microbial populations were maintained at an active level at all times. The microorganisms added during the later stages at high temperatures were moderate thermophilic and high temperature thermophilic cultures, which replenished the organisms lost during agglomeration and the subsequent standing period, and helped to increase microbial activity at high chalcopyrite leaching temperatures. Without the addition of an inoculum after agglomeration there is only a small thermophilic population, and thus thermophilic activity is low, as the heap temperature starts to increase. A successful advance to thermophilic operating conditions is therefore not possible.

Figure 5:
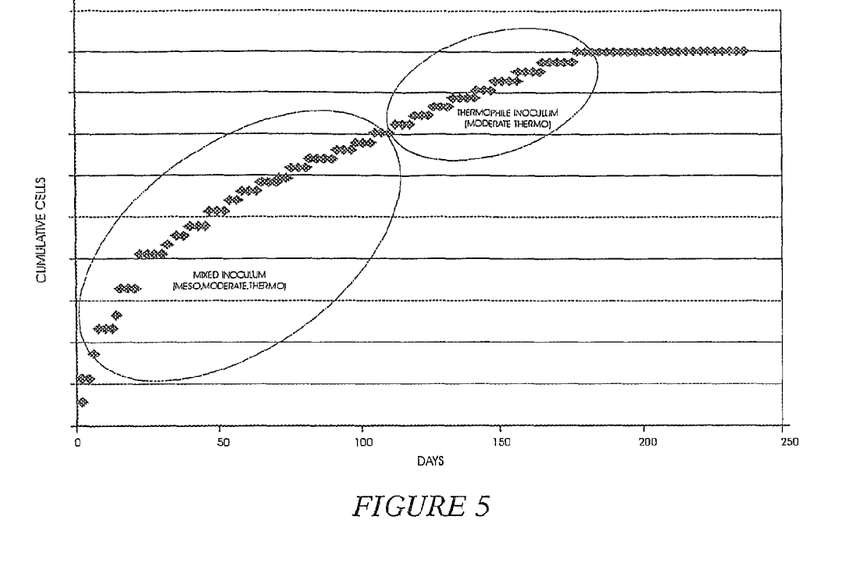
FIG. 5 depicts the accumulative amount of active microorganisms, as a function of time, added to a heap in an ongoing inoculation exercise.

FIG. 5 illustrates the accumulative cell count which results from the addition of a mixed inoculum of mesophiles, moderate thermophiles and thermophiles during an initial period after heap startup, and the subsequent use of a mixed inoculum of moderate thermophiles and thermophiles.

Re-inoculation of a heap using moderate thermophiles and thermophiles, to replenish organisms lost during agglomeration and standby, is thus necessary to achieve high operating temperatures.

Figure 11:
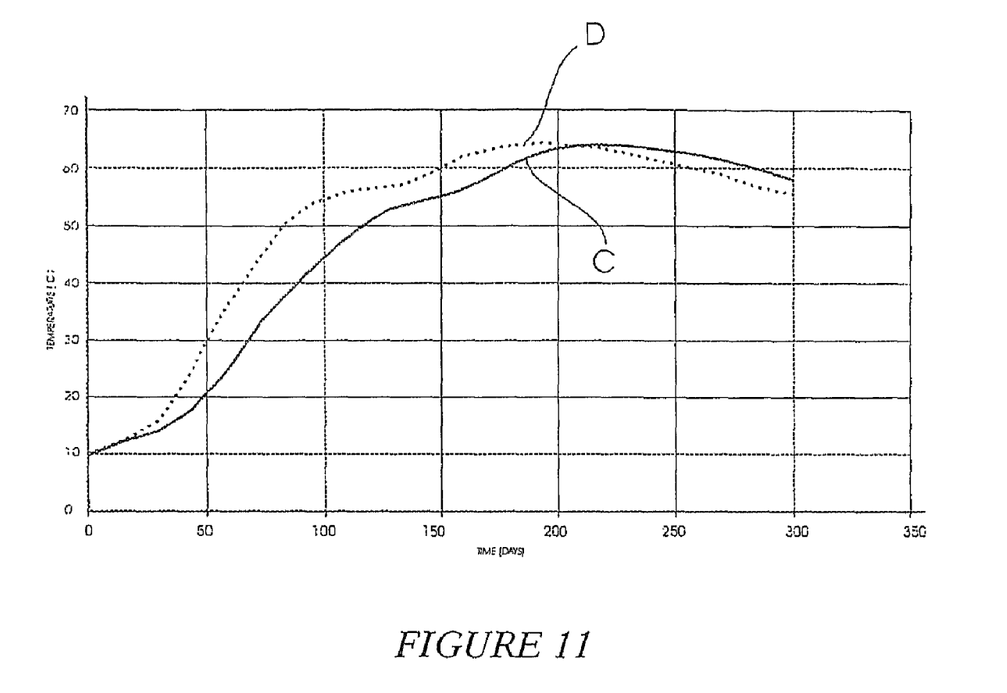
FIG. 11 illustrates the beneficial effect to heap temperature, after start up, of $CO_2$ addition to the heap.

It is important, however, to increase bacterial activity at low temperatures so as to decrease the startup lag time. FIG. 11 has a curve marked C of temperature versus time in a heap sparged with air alone, and a similar curve marked D of a heap sparged with air supplemented with 0,1% to 0,5% $CO_2$ v/v. The heap temperature rises at a significantly faster rate when $CO_2$ is added to the air at heap start-up, and thereafter.

Figure 10:
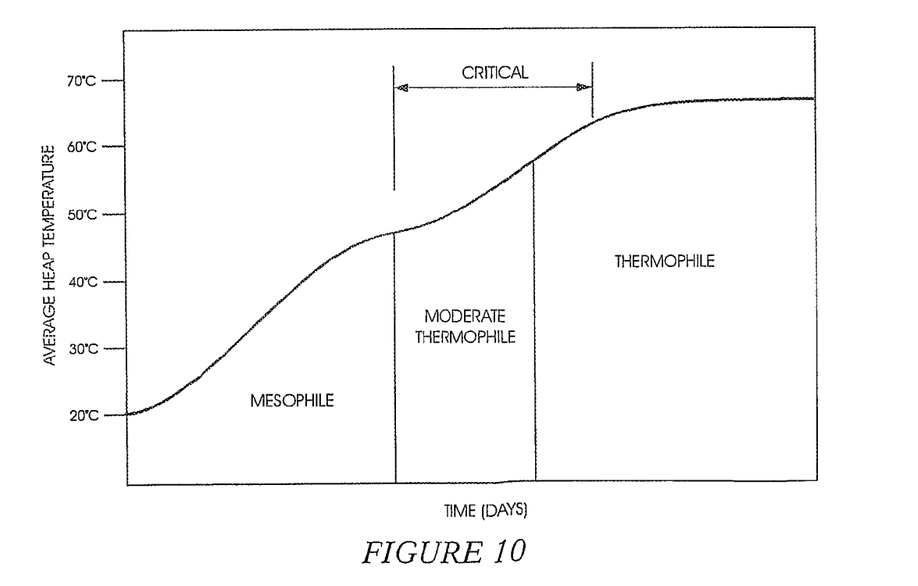
FIG. 10 is a curve which is similar to that shown in FIG. 1 of average heap temperature as a function of time indicating, as well, temperature regions in which different groups of microorganisms are active.

It is evident from the aforegoing that without the addition of good iron- and sulphur-oxidising moderate thermophilic and thermophilic cultures the heap temperature will not reach thermophilic values and will stagnate at about 55° C. This aspect is graphically shown in FIG. 10 which, as noted, is similar to FIG. 1. The effect of adding iron- and sulphur-oxidising cultures is illustrated by the following relationships:

$$S^{2-} + 4O_2 \xrightarrow{microbes} SO_4^{2-}$$

$$Fe^{2+} \xrightarrow{microbes} Fe^{3+} + e$$

$$\Delta H^0 = 400 \text{ MJ/kmol}/O_2$$

$$2,0 \text{ kg } O_2/\text{kg } S^{2-}$$

Figure 12:
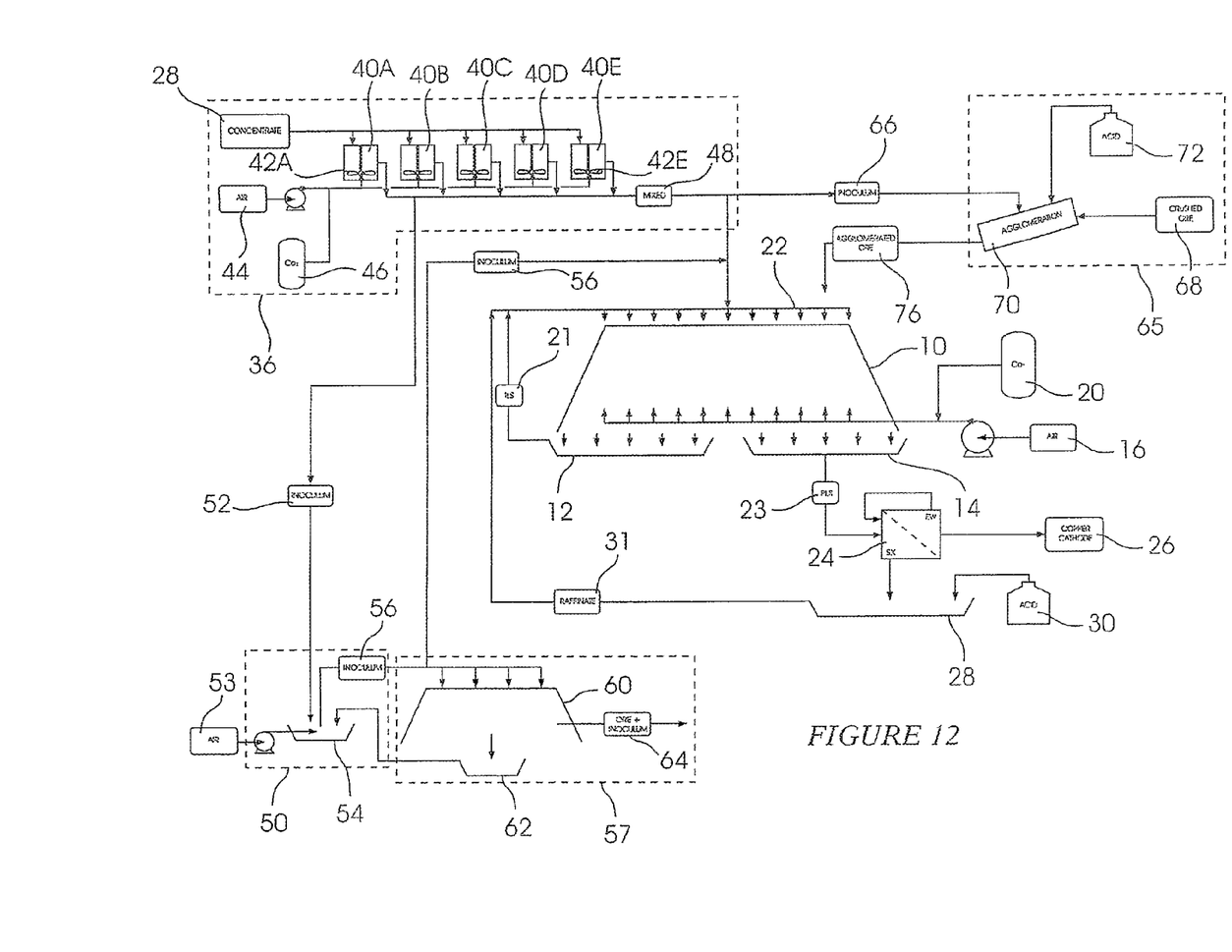
FIG. 12 is a block diagram representation of a high temperature heap bioleaching process with possible variations thereto, conducted in accordance with the principles of the invention.

FIG. 12 is a block diagram representation of a high temperature bioleaching process, for the recovery of copper, carried out on a heap of chalcopyrite ore, using the principles of the invention.

An objective is to maximise heat generation in the heap in order to increase the amount of copper recovered from the ore. In the mesophilic region $CO_2$ is added to maximise microbial growth as is shown in FIG. 10. Without the $CO_2$ addition the upper regions in the heap become depleted of $CO_2$ shortly after startup and this impacts negatively on microbial growth and heat generation.

Apart from the $CO_2$ addition thermophiles are inoculated into the heap after agglomeration, to ensure that the correct thermophilic microbes are present when the heap reaches thermophilic temperatures.

Referring to FIG. 12, a heap 10 is constructed from agglomerated ore which can be preinoculated at least with mesophilic and moderate thermophilic bacteria. The heap is constructed on pads 12 and 14 using conventional techniques. Air from a source 16 is sparged in a lower region of the heap, via a manifold 18. Carbon dioxide from a source 20 is added at a controlled rate, typically 0,1% $CO_2$ v/v, to the air stream.

An intermediate leach solution 21 collected in the pad 12 is optionally recirculated to an irrigation system 22 positioned above the heap.

Pregnant leach solution 23 collected in the pad 14 is subjected to a solvent extraction/electrowinning process 24 to recover the copper content of the pregnant leach solution on cathodes 26.

Raffinate from the stage 24 is collected in a pond or container 28 and supplemented, as necessary, with sulphuric acid from a source 30. Raffinate, which has a cell count of $10^6$ to $10^8$ cells/ml, is recycled (31) to the irrigation system 22.

To ensure that appropriate thermophilic microbes are present when the heap reaches thermophilic temperatures use can be made of different techniques. A first possibility is to make use of at least one build-up reactor in which an inoculum is cultivated. A portion of FIG. 12 enclosed in a dotted line block 36 illustrates an inoculum build-up process in which a concentrate 38 is introduced to a plurality of inoculum build-up reactors 40A to 40E, in which cultivation takes place of suitable microorganisms, active at temperatures of 25° C., 35° C., 50° C., 55° C. and 65° C. respectively. Each reactor is agitated by means of a respective impeller 42A to 42E and air 44 is directed into a lower region of each reactor. Carbon dioxide 46 is added to the air to maximise and control the inoculum build-up in each reactor. The carbon dioxide is present in the range of 0.1% to 5% v/v.

Inoculum 48 is drawn from each reactor, as required, to maximise the heat build-up in the heap 10. For example, referring to FIG. 5, a mixed inoculum containing mesophilic, moderate thermophilic and thermophilic microorganisms is added to the irrigation system during an initial startup period of the heap and thereafter, as the heap temperature rises, a mixed inoculum of moderate thermophilic and thermophilic microorganisms is added to the heap. The inoculum 48 can be added at regular intervals on a batch basis but preferably is added at a controlled and continuous rate. The cell count of the inoculum depends on the functioning of each reactor and on any dilution which may take place but typically lies in the range of from $10^7$ to $10^{10}$ cells/ml with a preferred value being in the range of from $10^8$ to $10^9$ cells/ml. An objective in this regard is to keep the cell count in the heap in the range of from $10^6$ to $10^{12}$ cells/ton of ore.

With the heap inoculated and re-inoculated in the aforesaid manner the average temperature curve in the heap closely follows the curve marked B in FIG. 4.

The process described in connection with the block 36 in FIG. 12 is a preferred way of elevating the operating temperature of the heap. Other techniques can however be used in place thereof or in combination therewith.

A block 50 illustrates a variation wherein inoculum 52 from one or more of the reactors 40 is directed to an inoculum pond 54. The pond, which is aerated (53), is used as a storage and maintenance pond and, as required, inoculum 56, typically with a cell count of from $10^5$ to $10^8$ cells/ml, is directed to the irrigation system 22.

In another refinement (57) inoculum 58, either from the pond 54 or from any of the reactors 40, is directed into a small separate heap 60 which is operated under closed circuit conditions. Solution draining from the heap is collected in a pond 62 and either is directly recirculated to the heap or is stored and maintained in the inoculum pond 54.

Ore 64 which contains desirable microorganisms is separated from the heap 60 and is then agglomerated with the ore in the heap 10 to help maintain the population of desirable microorganisms in the heap at appropriate levels.

A similar approach (65) is to use inoculum 66 from one or more of the reactors 40 and to inoculate crushed ore 68 which is agglomerated in a process 70. Sulphuric acid 72 is added to the agglomerated heap and the inoculated and agglomerated ore 74 is introduced into the heap 10 as required.

It is also possible to draw raffinate 31 from the pond 28 and intermediate leach solution 21 from the pad 12 and to direct one of the liquids or a mixture 74 of both liquids to the irrigation system to maintain the cell count in the heap.

The various techniques which have been described have the effect of adding thermophiles to the heap to ensure that the correct thermophilic microbes are present when the heap reaches thermophilic temperatures. This technique, preferably implemented together with the addition of $CO_2$ shortly after heap start-up, allows the temperature gap of from 50° C. to 60° C. in the heap to be successfully traversed.

The invention claimed is:

1. A method of conducting a bioleaching process to recover metal content from an ore which contains the metal that includes:
   (a) forming a main heap from the ore,
   (b) inoculating the heap with iron oxidizing mesophilic microorganisms, sulphuroxidising mesophilic microorganisms, and moderate thermophilic microorganisms,
   (c) culturing a mixed inoculum of moderate thermophilic and thermophilic microorganisms by using a plurality of reactors, each reactor being used for a respective microorganism that is active in a particular temperature range and wherein the particular temperature range is selected from temperatures which encompass the following temperature values 25° C., 35° C., 50° C., 55° C. and 65° C.,
   (d) adding carbon dioxide to the main heap while the main heap temperature is in a mesophilic temperature region, and
   (e) inoculating the main heap with the mixed inoculum before the heap temperature reaches a thermophilic temperature range to maintain the cell count in the heap at a value of from $10^6$ to $10^{12}$ cells/ton of ore.

2. A method according to claim 1 wherein an inoculum from each reactor is directed to a pond which is aerated and in which the inoculum is stored and maintained and a mixed inoculum from the pond is added to the heap as necessary.

3. A method according to claim 1 wherein inoculum from at least one of the reactors is added to crushed ore together with acid to form an inoculated ore, and the inoculated ore is added to the main heap to introduce the inoculum to the main heap.

4. A method according to claim 1 wherein inoculum from at least one of the reactors is used to irrigate an auxiliary heap which is operated as an inoculum generator and ore from the auxiliary heap, onto which active microorganisms have attached themselves, is added to the main heap to introduce the inoculum to the main heap.

5. A method according to claim 1 wherein an intermediate leach solution and raffinate produced by passing a pregnant leach solution, draining from the main heap, through a metal recovery process, are recirculated to the main heap to increase the active cell count in the main heap.

6. A method of bioleaching ore comprising:
   (a) forming a heap from the ore,
   (b) inoculating the heap with iron oxidizing microorganisms selected from the group consisting of mesophilic microorganisms, sulphuroxidising mesophilic microorganisms, moderate thermophilic microorganisms and mixtures thereof,
   (c) culturing a mixed inoculum of moderate thermophilic and thermophilic microorganisms by using a plurality of reactors, each reactor being used for a respective microorganism that is active in a particular temperature range and wherein the particular temperature range is selected from temperatures which encompass the following temperature values 25° C., 35° C., 50° C., 55° C. and 65° C., and
   (d) inoculating the heap with the mixed inoculum before the heap temperature reaches a thermophilic temperature range to maintain the cell count in the heap at a value of from $10^6$ to $10^{12}$ cells/ton of ore.

* * * * *